United States Patent [19]
McCowen

[11] Patent Number: 5,268,043
[45] Date of Patent: Dec. 7, 1993

[54] MAGNETIC SENSOR WIRE

[75] Inventor: Charles J. McCowen, Naugatuck, Conn.

[73] Assignee: Olin Corporation, New Haven, Conn.

[21] Appl. No.: 739,369

[22] Filed: Aug. 2, 1991

[51] Int. Cl.$^5$ .................. H01F 1/04; B32B 15/20
[52] U.S. Cl. ................. 148/310; 428/611; 428/614; 428/928; 428/674; 428/675; 428/676; 148/419; 148/413; 340/551; 340/572
[58] Field of Search ............... 428/611, 674, 675, 676, 428/928, 614, 607; 148/411, 414, 300, 306, 312, 419, 413, 310; 340/551, 572; 420/487, 582; 252/62.55

[56] References Cited

U.S. PATENT DOCUMENTS

| | | | |
|---|---|---|---|
| 2,920,381 | 1/1960 | Bozorth | 428/674 |
| 3,348,931 | 10/1967 | Reekstin | 426/676 |
| 3,820,090 | 6/1974 | Wiegand | 148/120 |
| 3,892,118 | 7/1975 | Wiegand | 148/101 |
| 4,099,995 | 7/1978 | Menth et al. | 148/101 |
| 4,116,726 | 10/1978 | Menth et al. | 148/101 |
| 4,174,966 | 11/1979 | Walkiewicz | 148/303 |
| 4,247,601 | 1/1981 | Wiegand | 428/611 |
| 4,330,347 | 5/1982 | Hirayama et al. | 428/614 |
| 4,461,685 | 7/1984 | Pryor | 204/146 |
| 4,495,487 | 1/1985 | Kavesh et al. | 148/306 |
| 4,525,432 | 6/1985 | Saito et al. | 428/928 |
| 4,657,583 | 4/1987 | Crane et al. | 75/348 |
| 4,663,242 | 5/1987 | Pryor et al. | 428/611 |
| 4,686,154 | 8/1987 | Mejia | 148/304 |
| 4,698,140 | 10/1987 | Crane et al. | 204/146 |
| 4,728,363 | 3/1988 | Crane et al. | 148/310 |
| 4,913,750 | 4/1990 | Kakuno et al. | 428/611 |
| 4,931,092 | 6/1990 | Cisar et al. | 148/105 |
| 4,950,550 | 8/1990 | Radeloff | 428/611 |

FOREIGN PATENT DOCUMENTS 50-070899 12/1975 Japan .................. 428/676

OTHER PUBLICATIONS

Opie et al., "A New Era of Application for the Wiegand Effect" appearing in SAE Technical Paper Series, presented at International Congress and Exposition, Detroit, Mich., Feb. 29–Mar. 4, 1988.
Sensor Engineering Company, entitled "Wiegand Effect Transducers" (Bulletin No. 103A), undated.

Primary Examiner—Gary P. Straub
Assistant Examiner—Valerie Ann Lund
Attorney, Agent, or Firm—Gregory S. Rosenblatt; Paul Weinstein

[57] ABSTRACT

There is provided a magnetic device having first and second portions with different magnetic coercivities. A magnetic field is induced in both the first and second portion. When exposed to a sufficiently high external magnetic field, the polarity of the first portion reverses generating a voltage pulse which may be detected by an external sensor. Either the first or second portion, or both, is formed from a copper alloy containing dispersed magnetic phase.

21 Claims, 2 Drawing Sheets

MAGNETIC SENSOR WIRE

BACKGROUND OF THE INVENTION

The present invention is directed to magnetic sensor wires. More particularly, the invention relates to a copper alloy having a magnetic second phase which generates a voltage pulse when passed through a magnetic field.

U.S. Pat. No. 3,820,090 to Wiegand discloses a bistable ferromagnetic wire. The wire has a core with low magnetic coercivity and an outer shell having a higher coercivity. The core and shell are magnetized in either the same or opposite longitudinal directions. Exposure to a sufficiently high magnetic field will induce a flux reversal in either the core alone or the core and shell. The shell having higher magnetic coercivity requires a stronger magnetic field to change direction. The direction of magnetization of the core can be changed without affecting the polarity of the shell. By proper manipulation of an external magnetic field, the direction of magnetization of the core can be switched to the same or opposite that of the shell.

The polarity switching occurs abruptly and corresponds to a point of discontinuity in the hysteresis loop of the sensor wire. The discontinuity is known to those skilled in the art as the Barkhausen effect. The Barkhausen effect generates a significant voltage pulse which may exceed 2 volts and is detectable by an external receiver.

Wires such as those disclosed in U.S. Pat. No. 3,820,090 have many applications. The speed of a rotating shaft may be determined without a detector physically contacting the shaft. A bistable wire is mounted on the shaft at one point along its circumference. As the shaft rotates, the wire passes through an external magnetic field generating a voltage pulse each time the wire enters the field. The voltage pulses are be counted by an external detector.

Other applications of the sensor wires include use as a magnetic key. A series of sensor wires are mounted on a nonmagnetic backing plate. By varying the direction of polarity of the core and shell, a unique voltage pattern is generated when the wire passes through a magnetic sensor. A detector is programmed to recognize that specific voltage pattern.

Sensor wires are also used in retail stores to deter shoplifting. The shift in the polarity of the core is detected as a voltage pulse triggering an alarm. Removal of the sensor by a sales clerk prevents triggering the alarm on exit.

Several means to form a bistable magnetic sensor wire have been disclosed. U.S. Pat. No. 3,820,090 discloses controlled heating and cooling of a precipitation hardenable magnetic wire such that the shell is hardened to a greater extent than the core. U.S. Pat. No. 3,892,118 to Wiegand, discloses increasing the magnetic coercivity of the outer shell by mechanical working. The wire is twisted while under tension.

Another way to form magnetically hard and soft regions is disclosed in U.S. Pat. No. 4,913,750 to Kakuno et al. A magnetic wire is drawn through a die to produce a hardened wire. Portions of the wire are then annealed to produce magnetically soft regions. U.S. Pat. No. 4,950,550 to Radeloff et al discloses cladding a magnetically hard material such as cobalt-vanadium-iron around a magnetically soft core such as nickel-iron.

The properties affecting the performance of the sensor wire include magnetic saturation, coercivity, the Barkhausen effect and the Curie temperature. Magnetic saturation is the level of magnetization after which additional increases in magnetic field strength do not produce additional magnetization. The larger the peak magnetization, the more pronounced the change when the polarity reverses and the larger the corresponding voltage pulse.

Coercivity is the strength of an external magnetic field which must be applied to cause the direction of magnetization to reverse. To prevent inadvertent changes in polarity, the shell of the sensor wire must have a higher coercivity than the core.

The Barkhausen effect is a discontinuity in the magnetic hysteresis loop of the sensor wire corresponding to polarity switching of the core or the shell. The more distinct the interface between core and shell, the more pronounced the effect and the larger the generated pulse.

The Curie temperature marks the transition between ferromagnetism and paramagnetism and identifies the maximum operating temperature of the sensor device.

One alloy used for sensor wires is Vicalloy (nominal composition 52% by weight cobalt, 10% vanadium and the remainder iron) as disclosed in U.S. Pat. No. 4,247,601 to Wiegand. A magnetically hard shell is formed by work hardening. A length of Vicalloy alloy wire is twisted while under tension, generating a shell with a higher magnetic coercivity than the core. The bistable Vicalloy alloy wire is characterized by a saturation magnetism of about 170 EMU/g, a coercivity of 30–60 oersteds and a Curie temperature of about 500° C. The material produces a voltage pulse in the range of from about 0.5 to about 2 volts. The alloy is expensive and contains strategically important cobalt and vanadium which are at times in short supply. Additionally, the work hardened wire is brittle and difficult to work.

Accordingly, it is an object of the invention to provide a bistable magnetic sensor wire which does not have the limitations of the prior art. It is a feature of the invention that either the core, the shell or both is an alloy with a copper matrix and a magnetic second phase. The wires have a magnetic saturation of about 60 EMU/g and a coercivity of anywhere from about 30 to about 900 oersteds.

It is an advantage of the present invention that the magnetic alloys do not contain strategic materials and are significantly less expensive than prior art sensor wires. The alloys have improved ductility, permitting the fabrication of more precise sensors. The voltage outputs are increased due to a sharp magnetic gradient.

The above stated objects, features and advantages will become more clear from the specification and drawings which follow.

SUMMARY OF THE INVENTION

In accordance with the invention, there is provided a magnetic device. The magnetic device has a first portion with a first magnetic coercivity and a second portion with a higher coercivity adjacent the first. At least one of the portions has a magnetic phase dispersed in a predominantly copper matrix.

IN THE DRAWINGS

Figure 4:
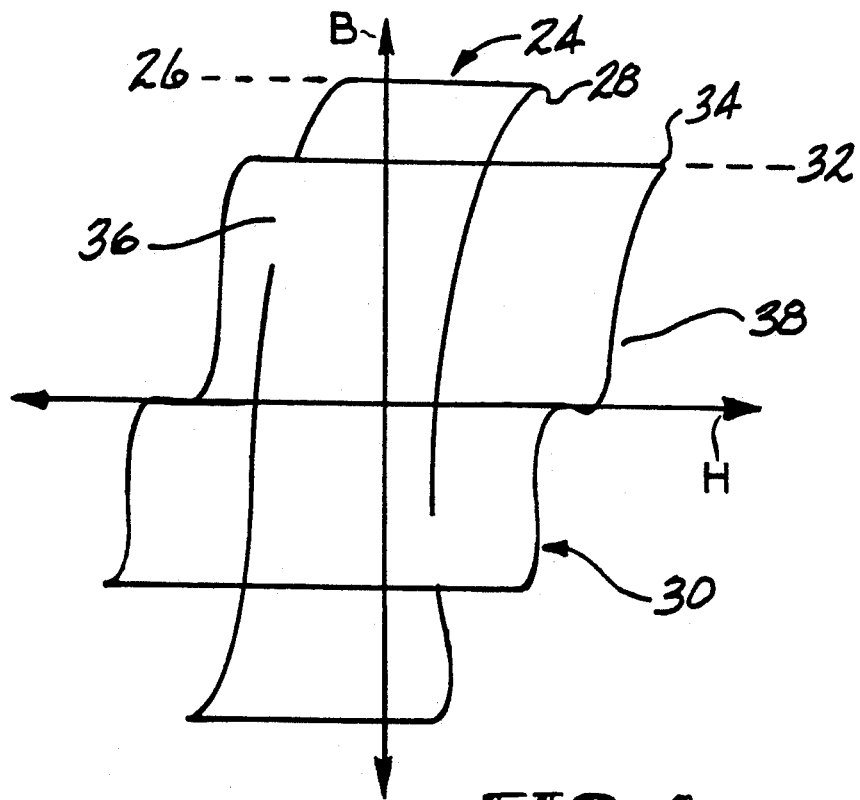

FIG. 4 compares the hysteresis loop of the materials of the invention with the prior art.

Figure 5:
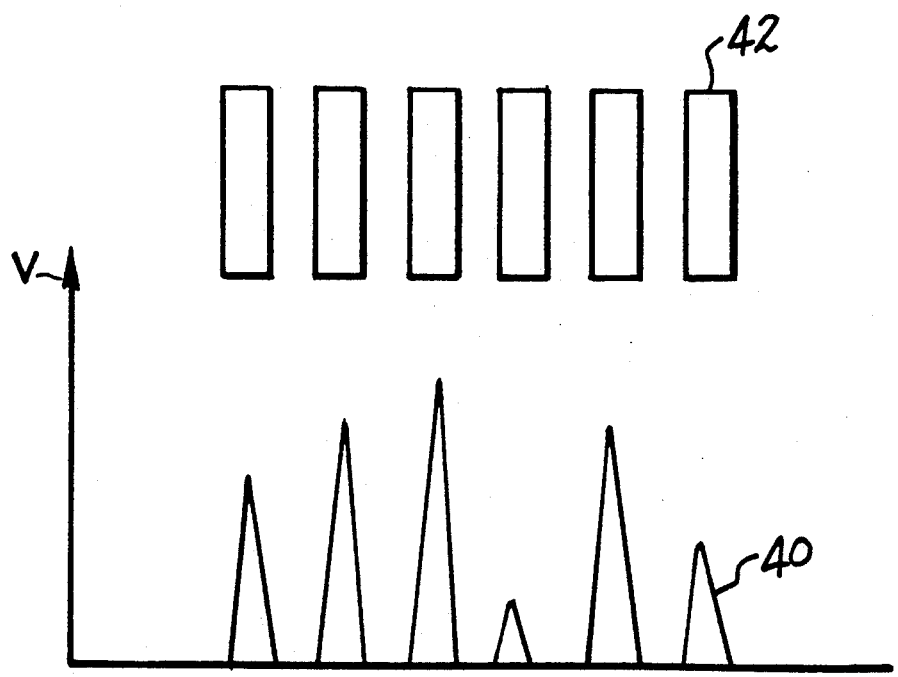

FIG. 5 shows a series of voltage pulses obtained by passing the composite materials of the invention through an external magnetic field.

DISCLOSURE OF THE INVENTION

Figure 1:
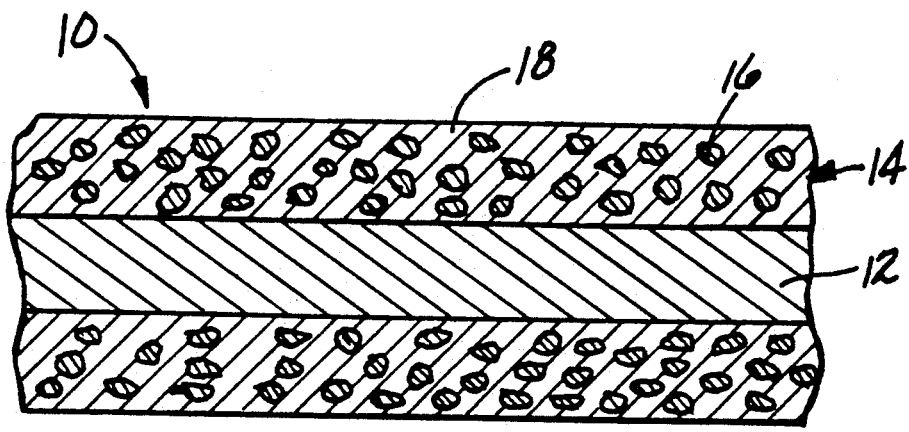
FIG. 1 shows in cross sectional representation a composite magnetic device in accordance with a first embodiment of the invention.

With reference to FIG. 1, a magnetic device 10 has a first portion 12 and second portion 14 adjacent the first portion on either one or both sides. It is preferable that the second portion 14 be adjacent both sides to increase the magnetic effect. A more preferred configuration is a wire with the second portion completely surroundings the core to provide a maximum magnetic effect.

The second portion 14 may be compositionally different material than the first and bonded to the first portion such as by cladding. Alternatively, the second portion 14 may be of the same composition with different magnetic properties resulting from processing variations.

The first portion 12 is any conventional magnetically soft material having a relatively low coercivity so that a small magnetic field will reverse the magnetic polarity. One suitable metal is iron, possibly alloyed with other elements such as cobalt, magnesium or nickel or mixtures thereof.

At least one of the portions (12 or 14) is a copper alloy with a magnetic phase dispersed in a predominantly copper matrix. Preferred alloys have from about 5 to about 40% by weight iron, and from about 5 to about 40% by weight nickel with the balance essentially copper. If desired, the alloy may contain up to 40% by weight of cobalt, chromium, zirconium, magnesium and/or manganese either as additional elements for assisting in alloy casting and/or processing or as substitutes for some of the iron and/or nickel content of the alloy. Whatever the composition, sufficient copper is present to form a predominantly copper matrix supporting the magnetic phase. Preferably, the concentration of iron and nickel are each in the range of from about 8 to about 20%.

Preferred alloying additions include from an effective concentration up to about 1% by weight of magnesium and from an effective concentration up to about 15% by weight cobalt. The most preferred alloy systems contain from about 12 to about 18% by weight nickel, from about 12 to about 18% by weight iron, from about 0.1 to about 0.4% by weight magnesium and the balance copper, or from about 8 to about 12% iron, from about 8 to about 12% nickel, from about 8 to about 12% cobalt and the balance copper.

The magnetic copper alloy can be processed to have a coercivity of up to 900 oersteds. The relatively high coercivity which may be obtained makes the alloys particularly suitable as the second portion. However, other magnetically hard materials such as cobalt-vanadium-iron may form the second portion 14. Accordingly, at least one of the first portion 12 and the second portion 14 has a magnetic phase dispersed in a predominantly copper matrix with the coercivity of the first portion 12 less than that of the second.

The copper alloy processing to obtain a dual phase structure is as follows. The starting material is processed by any conventional manner to strip or wire. For example, copper may be melted and desired alloying additions made to the melt. The melt is then cast. After casting, the starting material may be homogenized and quenched, hot worked such as by hot rolling and/or cold work such as by cold rolling until the material has reached a desired gauge. If desired, the material may be subjected to one or more anneals during processing.

To form wire, the starting material may be cast as a billet and then drawn to gauge by either hot or cold drawing. Alternatively, a strip may be mechanically deformed to wire by any known process such as passing through a series of grooved rolls.

In one exemplary process, the cast alloy is homogenized at from about 1000° C. to about 1100° C. for about 30 minutes to about 350 hours, cooled to room temperature at a cooling rate that does not impair subsequent cold workability and then cold rolled.

After the material has been processed to the desired gauge, the material is preferably solution heat treated and quenched. Both solution heat treatment and quenching are performed in any suitable manner known in the art. For the aforementioned copper-nickel-iron alloy system, the solution heat treatment step may be at a temperature of from about 950° C. to about 1200° C. for a time in the range of from about 1 minute to about 48 hours. Preferably, the solution heat treatment is at a temperature in the range of from about 1000° C. to about 1100° C. for from about 1 minute to about 4 hours. For certain alloy systems, the solution heat treating and quenching steps may be omitted, since the quenching after hot working serves the same purpose.

The final step of material processing comprises thermal treatment to produce magnetic particles. If acicular particles are desired, a cold rolling step immediately precedes thermal aging. For spherical particles, the cold rolling step is omitted. Thermal aging may be carried out at a temperature in the range of from about 550° C. to about 800° C., preferably at a temperature in the range of about 600° C. to about 700° C. for a time period up to about 48 hours, and preferably, in the range of from about 1 to about 8 hours.

The iron-nickel second phase is then magnetized with the polarity aligned by exposure to an external magnetic field. Preferably, a magnetic field well above the coercivity of both the core and the surface first aligns both in the same direction. Then, a relatively less strong magnetic field, greater than the coercivity of the core but not that of the surface, reverses the polarity of the core without switching the surface.

The resultant second phase magnetic particles have a composition of about 40 to about 55 weight percent nickel, less than about 9 wt. % copper and the balance iron. When spherical, the radius is from about 10 to about 500 angstroms and preferably from about 30 to about 300 angstroms. Subsequently cold working the strip such as by rolling elongates the magnetic particles to an acicular shape. When acicular, an aspect ratio of from about 5:1 to about 10:1 is preferred. Increasing the aspect ratio increases the coercivity. While spherical particles have a coercivity of from about 300 to about 500 oersteds, acicular particle coercivity is from about 1500 to about 2000 oersteds. Regardless the shape of the second phase magnetic particles, for optimum operation of the magnetic device, the magnetic coercivity is in the range of from about 30 to about 900 oersteds and preferably from about 100 to about 300 oersteds. It should be noted that the predominately copper matrix surrounding the magnetic particles is paramagnetic and does not affect the coercivity.

According to a first method of manufacture resulting in the composite of FIG. 1, separate second portions 14 are adjacent the first portion 12 and metallurgically bonded such as by cladding. Cladding may be by either cold or hot rolling with a first pass reduction sufficient for metallurgical bonding. Generally, the first pass reduction will be on the order of about 50 to 70%. If spherical second phase particles 16 are desired, cladding is before thermal aging of the second portion 14. If acicular particles are desired, the thermal aging occurs before cladding.

In addition to composite strip, the second material 14 may be clad to the outside of a wire or bonded to any other shaped substrate.

Figure 2:
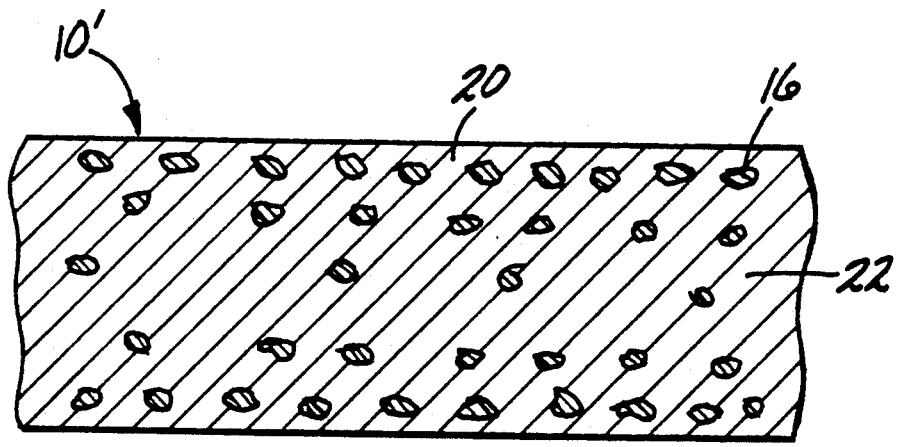
FIG. 2 shows in cross sectional representation a magnetic device formed by heat treating a solutionized copper alloy in accordance with a second embodiment of the invention.
Figure 3:
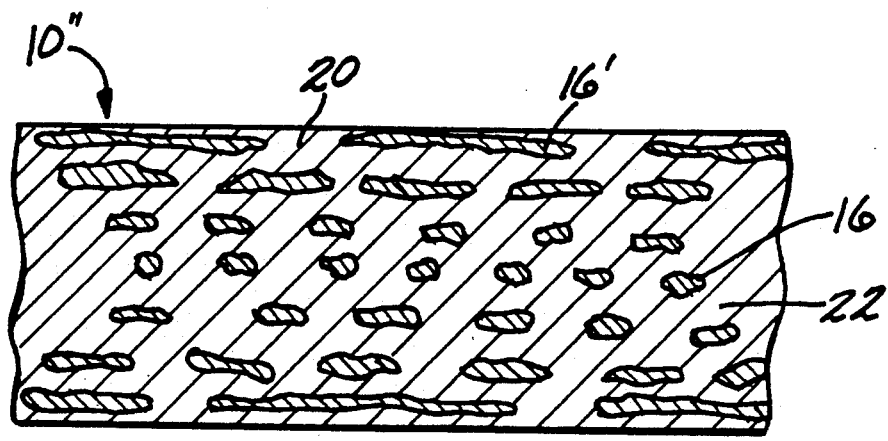
FIG. 3 shows in cross sectional representation a magnetic device formed by drawing a copper alloy wire containing a magnetic second phase.

The magnetic device may also be formed from a single material as illustrated in either FIG. 2 or FIG. 3. This material has a magnetic phase dispersed in a predominantly copper matrix and may be formed from any of the copper alloys disclosed above. The alloy is then processed so that the concentration and/or spatial distribution of magnetic particles is increased at the surface. Processing may be by any suitable thermal or mechanical means.

In a first processing method, the magnetic device 10' of FIG. 2 is formed by heating a copper alloy strip to a temperature sufficient to solutionize the entire strip and then quenched to freeze the solid solution. Controlled subsequent heating precipitates a larger sized magnetic second phase 16 at the surface 20 than at the core 22.

Alternatively, as illustrated in FIG. 3, the strip 10" is precipitation aged forming spherical particles 16. The strip is then wire drawn, elongating the second phase particles 16' near the surface 20, raising surface coercivity. The core 22 particles 16 are not similarly elongated and maintain a relatively low coercivity.

The magnetic saturation of the copper alloys is in the range of about 40 EMU/g to about 60 EMU/g. While less than the magnetic saturation of Vicalloy, as shown in FIG. 4, the more pronounced magnetic gradient achieved by cladding results in a higher voltage output. The magnetic hysteresis loop 24 for Vicalloy wire formed into a bistable magnetic device by conventional processing has a magnetic saturation 26 of about 170 EMU/g and a coercivity 28 of about 30-60 oersteds. The magnetic hysteresis loop 30 for a clad magnetic device having a copper alloy component, has a magnetic saturation 32 of about 60 EMU/g. The magnetic coercivity 34 is anywhere between 30 and 900 oersteds based on processing.

One advantage of the materials of the invention is increased coercivity. The intensity of an external magnetic field required to reverse the polarity of the device is higher. This decreases the probability of a premature polarity switch from stray magnetic fields.

The Barkhausen discontinuity 36 of a conventional sensor wire produces a small voltage pulse. The more pronounced discontinuity 38 of a clad produces a larger voltage pulse. The larger pulse permits a detecting sensor to be located farther from the magnetic device and lessens the possibility an extraneous voltage pulse will be misinterpreted by the detector.

FIG. 5 shows a second advantage of the composites of the invention. The size of the discontinuity may be adjusted by changing the magnetic gradient between the first and second portions to obtain a range of voltage pulses 40. A series of composite magnetic strips 42 are fastened to a nonmagnetic substrate, for example, a plastic card. Each magnetic strip 42 can have a distinct Barkhausen discontinuity achieved by the thickness or amount of processing of the second portion of the clad material and generate a unique magnetic pulse 40. A distinct signature capable of activating a device is achieved. Since the magnetic properties of each strip are different, the key is difficult to counterfeit. The unique magnetic signature may also be used as a identification means for magnetic scanning of prices or to identify goods passing through the sensor.

The Example which follows illustrates the advantages of the composite material of the invention. The Example is exemplary of the alloys of the invention and is not intended to limit the scope of the invention.

EXAMPLE

A wire having the composition 15 wt. % iron, 15 wt. % nickel, 0.2 wt. % magnesium and the balance copper was thermally treated to precipitate the magnetic phase. The wire was drawn to a 95% cross sectional reduction to a diameter of about 0.010 inches forming a bistable magnetic device. The drawn wire had a magnetic saturation of about 70 EMU/g and a coercivity of about 600 oersteds. The wire has a constricted hysteresis loop indicative of a nonuniform distribution of magnetic particles.

While the invention has been described in terms of one and two component sensors having a copper alloy component, it is within the scope of the invention to include multiple layer sensors. For example, a three component sensor having a polymer coating to provide improved thermal protection. Another advantage of a three or more component sensor is more detailed encoding. If each layer is magnetic with a different magnetic saturation and/or coercivity, more complex polarity switching combinations are achieved.

The patents set forth in this specification are intended to be incorporated by reference herein.

It is apparent that there has been provided in accordance with this invention a magnetic sensor device utilizing a magnetic copper alloy which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A magnetic device capable of generating a voltage pulse when passed through an external magnetic field, comprising:

a first portion containing from about 5 to about 40% by weight iron, from about 5 to about 40% by weight nickel and the balance copper, said first portion having a magnetic phase dispersed in a predominantly copper matrix and having a first magnetic coercivity; and a second portion adjacent to said first portion, said second portion having a second magnetic coercivity, said second magnetic coercivity being greater than said first magnetic coercivity.

2. The magnetic device of claim 1 wherein said second portion is a separate material bonded to said first portion.

3. The magnetic device of claim 2 wherein said first portion further contains up to about 40% by weight of an addition selected from the group consisting of cobalt, chromium, zirconium, magnesium, manganese and mixtures thereof.

4. The magnetic device of claim 3 wherein the concentration of said iron is from about 8 to about 20% by weight and the concentration of said nickel is from about 8 to about 20% by weight.

5. The magnetic device of claim 4 wherein said first portion contains from about 10 to about 20% by weight iron, from about 10 to about 20% by weight nickel, an effective amount up to about 1% by weight magnesium and the balance copper.

6. The magnetic device of claim 5 wherein said first portion contains from about 12 to about 18% by weight nickel, from about 12 to about 18% by weight iron, from about 0.1 to about 0.4% magnesium and the balance copper.

7. The magnetic device of claim 4 wherein said first portion contains from about 8 to about 20% by weight iron, from about 8 to about 20% by weight nickel, an effective amount up to about 15% cobalt and the balance copper.

8. The magnetic device of claim 7 wherein said first portion contains 8-12% by weight iron, 8-12% by weight nickel, 8-12% by weight cobalt and the balance copper.

9. The magnetic device of claim 4 wherein said second portion contains from about 8 to about 20% by weight iron, from about 8 to about 20% by weight nickel and an effective amount up to about 1% magnesium and the balance copper.

10. The magnetic device of claim 9 wherein said second portion contains from about 12 to about 18% by weight nickel, from about 12 to about 18% by weight iron, from about 0.1 to about 0.4% by weight magnesium, and the balance copper.

11. The magnetic device of claim 4 wherein said second portion contains from about 8 to about 20% by weight iron, from about 8 to about 20% by weight nickel, an effective amount up to about 15% by weight cobalt and the balance copper.

12. The magnetic device of claim 11 wherein said second portion contains from about 8 to about 12% by weight iron, from about 8 to about 12% by weight nickel, from about 8 to about 12% by weight cobalt and the balance copper.

13. The magnetic device of claim 4 in the form of a wire with said second portion surrounding said first portion.

14. The magnetic device of claim 13 wherein the first portion has a magnetic polarity opposite that of said second portion.

15. The magnetic device of claim 4 in the form of a strip with said second portion adjacent both sides of said first portion.

16. The magnetic device of claim 15 wherein the first portion has a magnetic polarity opposite that of said second portion.

17. A magnetic device capable of generating a voltage pulse when passed through an external magnetic field, comprising:
a first portion having a first magnetic coercivity; and
a second portion bonded to said first portion, said second portion containing from about 5 to about 40% by weight iron, from about 5 to about 40% by weight nickel, up to about 40% by weight of an additive selected from the group consisting of cobalt, chromium, zirconium, magnesium, manganese and mixtures thereof, and the balance copper, said second portion having a magnetic phase dispersed in a predominantly copper matrix and a second magnetic coercivity, said second magnetic coercivity being greater than said first magnetic coercivity.

18. The magnetic device of claim 17 wherein said second portion contains from about 8 to about 20% by weight iron, from about 8 to about 20% by weight nickel, an effective amount up to about 1% by weight magnesium and the balance copper.

19. The magnetic device of claim 18 wherein said second portion has the composition of from about 12 to about 18% by weight nickel, from about 12 to about 18% by weight iron, from about 0.1 to about 0.4% magnesium and the balance copper.

20. The magnetic device of claim 17 wherein said second portion contains from about 8 to about 20% by weight iron, from about 8 to about 20% by weight nickel, an effective amount up to about 15% by weight cobalt and the balance copper.

21. The magnetic device of claim 20 wherein said second portion contains from about 8 to about 12% iron, from about 8 to about 12% nickel, from about 8 to about 12% cobalt and the balance copper.

* * * * *